US009663059B2

(12) United States Patent
Anderson

(10) Patent No.: US 9,663,059 B2
(45) Date of Patent: May 30, 2017

(54) DUAL CHAMBERED PASSENGER AIRBAG

(71) Applicant: TK Holdings Inc., Auburn Hills, MI (US)

(72) Inventor: Christopher L. Anderson, Harrison Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 107 days.

(21) Appl. No.: 14/557,391

(22) Filed: Dec. 1, 2014

(65) Prior Publication Data

US 2015/0151709 A1 Jun. 4, 2015

Related U.S. Application Data

(60) Provisional application No. 61/910,278, filed on Nov. 29, 2013.

(51) Int. Cl.
*B60R 21/26* (2011.01)
*B60R 21/233* (2006.01)
*B60R 21/239* (2006.01)

(52) U.S. Cl.
CPC .......... *B60R 21/233* (2013.01); *B60R 21/239* (2013.01); *B60R 2021/2395* (2013.01); *B60R 2021/23324* (2013.01)

(58) Field of Classification Search
CPC ...................... B60R 2021/2395; B60R 21/233
USPC .................................. 280/736, 743.1, 730.2
See application file for complete search history.

(56) References Cited

U.S. PATENT DOCUMENTS 4,176,858 A 12/1979 Kornhauser
5,586,782 A * 12/1996 Zimmerman et al. ...... 280/730.2
5,697,641 A * 12/1997 McGee ............. B60R 21/23138 280/730.2
5,853,191 A * 12/1998 Lachat ........................ 280/730.2
5,918,902 A * 7/1999 Acker et al. ............... 280/743.1
6,257,618 B1 * 7/2001 Tschaschke et al. ....... 280/743.2
7,543,850 B2 6/2009 Bachraty et al.
7,862,082 B2 * 1/2011 Thomas ......................... 280/740
8,888,128 B1 * 11/2014 Seo ............................... 280/739
2007/0170710 A1 * 7/2007 Bouquier ....................... 280/739
2008/0073892 A1 * 3/2008 Rose et al. ..................... 280/739
2009/0045611 A1 * 2/2009 Kim ........................... 280/730.2
2011/0018240 A1 1/2011 Marable et al.
2011/0031725 A1 * 2/2011 Rose et al. ..................... 280/736
2012/0248746 A1 10/2012 Yamamoto
2013/0313809 A1 11/2013 Yamaji
2014/0306433 A1 * 10/2014 Anderson et al. ............ 280/729
2015/0091279 A1 * 4/2015 Anderson ...................... 280/729

FOREIGN PATENT DOCUMENTS

JP 10-100827 4/1998
KR 20040073017 8/2004

* cited by examiner

*Primary Examiner* — Faye M Fleming
(74) *Attorney, Agent, or Firm* — L.C. Begin & Associates, PLLC

(57) ABSTRACT

A divider for an airbag includes a first side, a second side opposite the first side, and at least one opening structured to enable fluid communication between the first side and the second side. A valve cover is positioned on the second side over the at least one opening. The valve cover has a first pair of opposed edges attached to the divider, and another edge extending between the edges of the first pair of opposed edges, the other edge being attached to the divider.

26 Claims, 7 Drawing Sheets

DUAL CHAMBERED PASSENGER AIRBAG

CROSS-REFERENCE TO RELATED APPLICATIONS

This application claims the benefit of U.S. Provisional Application Ser. Nos. 61/910,278, filed on Nov. 29, 2013, the disclosure of which is incorporated herein by reference in its entirety.

BACKGROUND OF THE INVENTION

The present invention relates a passenger airbag, which is filled with gas during an emergency situation such as, for example, a frontal or side impact.

In certain applications of inflatable vehicle airbags, it may be necessary or desirable to control gas flow between portions of the airbag interior during airbag inflation and/or while a vehicle passenger is in contact with the inflated airbag. This flow control may be achieved using a valve mechanism positioned and structured to regulate gas flow between the airbag interior portions. The valve mechanism may be structured to permit gas to flow freely into all portions of the airbag during inflation, while restricting gas backflow in a direction opposite the inflation flow direction. Many existing valve designs have been found have excessively long reaction times in response to changing pressure differentials. Existing designs may also be difficult to fabricate and/or ineffective at restricting gas backflow to the degree required. Thus, an ongoing need exists for flow restriction valve designs with rapid response times, to prevent excessive gas loss from portions of an inflated airbag during a collision event

SUMMARY OF THE INVENTION

In one aspect of the embodiments described herein, a divider for an airbag is provided. The divider includes a first side, a second side opposite the first side, and at least one opening structured to enable fluid communication between the first side and the second side. A valve cover is positioned on the second side over the at least one opening. The valve cover has a first pair of opposed edges attached to the divider, and another edge extending between the edges of the first pair of opposed edges, the other edge being attached to the divider.

In another aspect of the embodiments of the described herein, a divider for an airbag is provided. The divider includes a first side, a second side opposite the first side, and at least one opening structured to enable fluid communication between the first side and the second side. A valve cover is positioned on the second side over the at least one opening. The valve cover has a first pair of opposed edges attached to the divider and a second pair of opposed edges unattached to the divider. A portion of the cover residing between the second pair of opposed edges is structured so as to be spaced apart from the divider a distance greater than a distance between the divider and either edge of the second pair of opposed edges, responsive to a pressure differential wherein a pressure on the first side is greater than a pressure on the second side.

In another aspect of the embodiments of the described herein, a divider for an airbag is provided. The divider includes a first side, a second side opposite the first side, and at least one opening structured to enable fluid communication between the first side and the second side. A valve cover is positioned on the second side over the at least one opening. The valve cover has a first pair of opposed edges attached to the divider and a second pair of opposed edges unattached to the divider. A width of the cover between the edges of the second pair of opposed edges is less than a width of the cover along either edge of the second pair of opposed edges.

DETAILED DESCRIPTION

Figure 1:
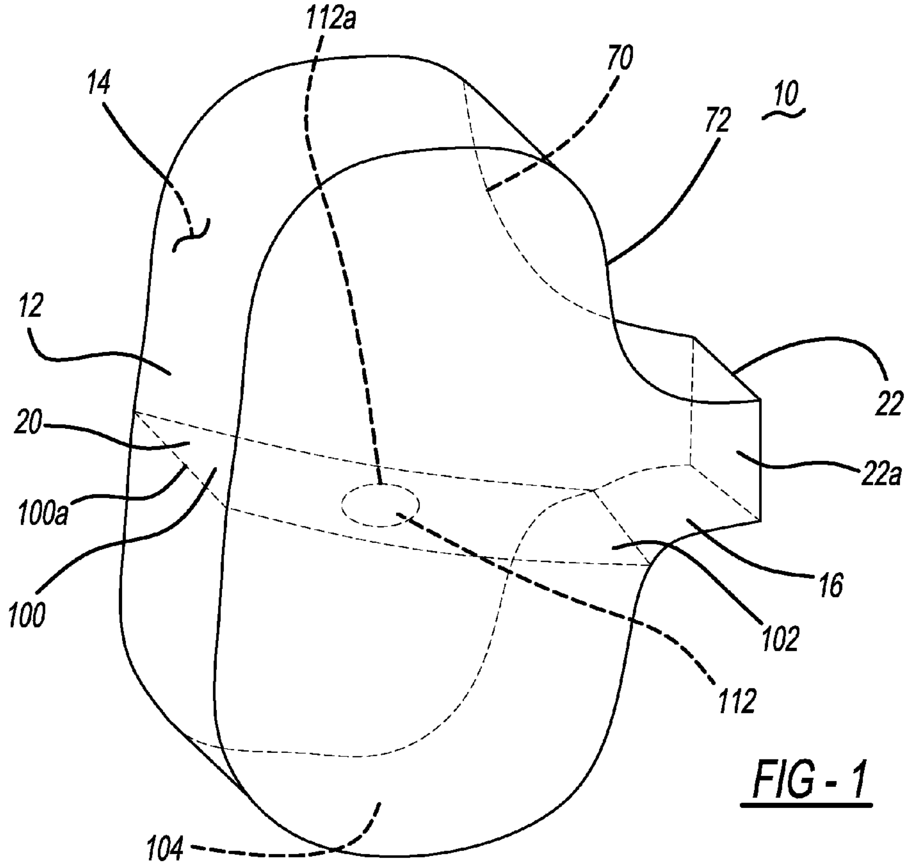
FIG. 1 is a perspective view of a passenger-side airbag (in an inflated state) incorporating an airbag divider and a flow restriction valve mechanism in accordance with an embodiment described herein.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

FIG. 1 is a perspective view of one embodiment of a passenger-side airbag 10 (in an inflated state). The airbag embodiment shown in FIG. 1 is formed from three panels. Specifically, the airbag is formed of a main panel 12, a left side (when viewing the airbag from a seated position) panel 14, and a right side panel 16 opposite the right side panel 14. Each of the side panels 14, 16 is generally planar (when the airbag 10 is not inflated). The main panel 12 connects the left and right panels and wraps around the airbag 10. As a result, the entirety of the right edge of the main panel 12 is connected along a seam 70 (e.g., by stitching, sewing, adhesive attachment or other suitable means) to the right panel 14 and the entirety of the left edge of the main panel 12 is connected along a seam 72 (e.g., by stitching, sewing, or other suitable means) to the right panel 16. Panels 12, 14 and 16 combine to form an outer shell defining an interior of the airbag.

The main panel 12 has both a front impact side or occupant contact face 20 and a rear inflation side 22. Side panels 14 and 16 and main panel 12 also combine to define a mouth 22*a* of the airbag through which gas is injected into the airbag. After wrapping around the airbag 10, ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). Portions of one or more of panels 12, 14, 16 defining upper chamber 102 may also incorporate one or more vents (not shown) therein to release gas from the upper chamber to an exterior of the airbag in a controlled manner during contact between a passenger and the airbag.

Referring to FIG. 1, a divider 100 is stitched or otherwise suitably attached along a perimeter thereof to interior surfaces of the main, left and right airbag panels. The divider 100 may be attached to the panel interior surfaces so as to form a gas-tight seal between the divider and the panels to which it is attached. Divider 100 divides the airbag interior into a first or upper chamber 102 and a second or lower chamber 104. In the embodiment shown in FIG. 1, the divider has a leading edge 100*a* attached to occupant contact face 20, a pair of opposite side edges attached to respective ones of side panels 14 and 16, and a rear edge attached to the main panel 12 along the rear inflation side of the airbag. When attached to the panels 12, 14 and 16, divider 100 has one side or face positioned within and facing upper chamber 102, and an opposite side positioned within and facing lower chamber 104.

Panels 12, 14 and 16 and divider 100 may be formed in a known manner from gas-impermeable fabric(s) or other suitable gas-impermeable material(s).

An inter-chamber venting mechanism is incorporated into or otherwise operatively coupled to the divider to permit gas to flow from the upper chamber into the lower chamber, and also to restrict backflow from the lower chamber 104 back into the upper chamber 102. In one embodiment, the venting mechanism is in the form of one or more opening(s) (schematically shown as element 112*a* in FIG. 1) formed in divider 100, and a flow restriction valve mechanism (schematically shown as element 112 in FIG. 1) incorporated into or operatively attached to divider 100 for controlling gas flow through each of opening(s) 112*a* between the upper and lower chambers. Valve 112 may have any of a number of structures suitable for restricting gas flow in the airbag interior, in the manner described herein.

In the embodiments described herein, the parameters of the gas flow openings formed in the divider are specified so as to provide a total cross-sectional gas flow passage area needed to enable a volumetric flow rate of gas through the slit(s) sufficient to fill the airbag lower chamber within a desired time period, when the valve mechanisms are forced into an open condition by gas flow from the upper chamber 102 into the lower chamber 104. The opening dimensions and/or number of openings needed to enable the desired flow rate may be determined analytically or iteratively, by experimentation, using known methods.

In the embodiment shown in FIGS. 2-3B and 5A-5B, at least one circular opening 112*a* is provided to enable fluid communication between upper chamber 102 and lower chamber 104. Although a single opening 112*a* is provided in the embodiments shown in FIGS. 1, 2 and 5, a plurality of openings may be used. Alternatively, opening(s) 112*a* may have a shape or shapes other than circular, as described herein. Each of opening(s) 112*a* is defined by an edge 112*b*.

In the embodiments described herein, the flow restriction valve mechanism 112 is positioned and structured to permit gas flowing into or residing in upper chamber 102 to flow freely through opening(s) 112*a* into lower chamber 104, while restricting backflow of the gases from the lower chamber into the upper chamber. Further to this end, in particular embodiments, the flow restriction valve mechanism 112 is structured to close responsive to occurrence of a pressure differential between the lower and upper chambers tending to force gas in a direction opposite the airbag fill direction (i.e., tending to force gas in a direction from the second chamber into the first chamber), thus enabling maintenance of a prolonged sustained relatively high, inflated pressure in the lower chamber. Such a reverse pressure differential may occur, for example, responsive to a vehicle passenger contacting the airbag exterior along the lower chamber 104 during or after airbag inflation. The gas flow rate from the upper chamber 102 into the lower chamber 104 through opening 112*a* may be controlled by controlling the dimensions of opening(s) 112*a* and the valve structure and dimensions.

Figure 4A:
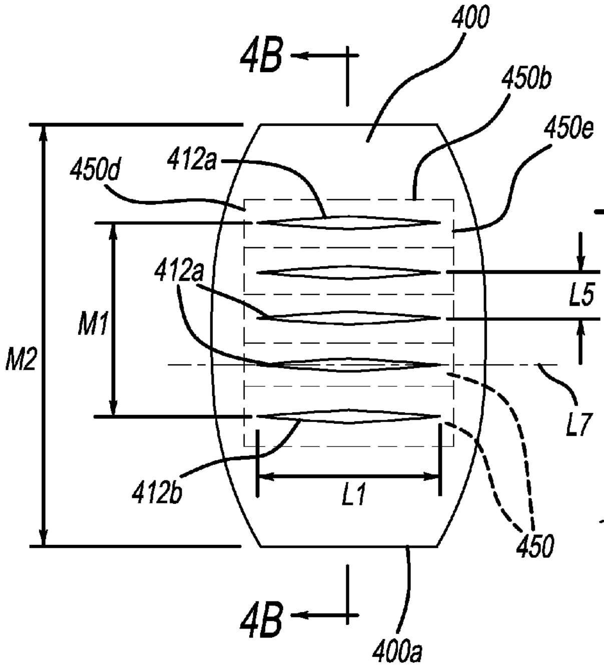
FIG. 4A shows a plan view of a flow restriction valve mechanism in accordance with one particular embodiment, with the valve in an open condition and viewed looking in a direction from the upper chamber toward the divider.
Figure 4B:
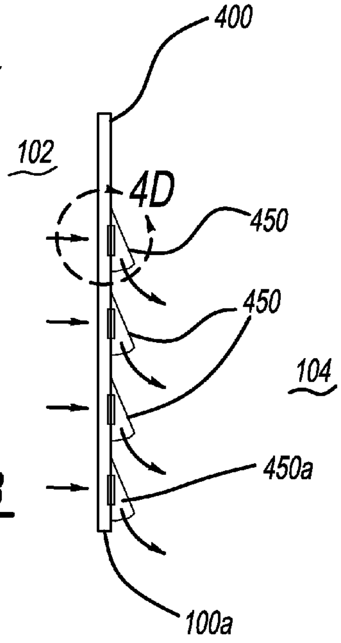
FIG. 4B shows a cross-sectional side view of the valve mechanism of FIG. 4A.
Figure 4C:
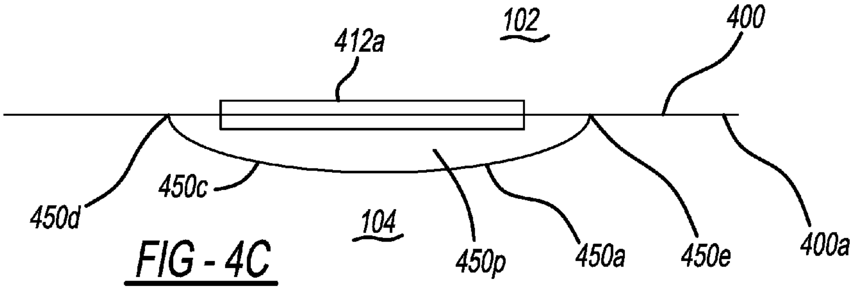
FIG. 4C shows a cross-sectional end view of a portion of the valve mechanism shown in FIG. 4B.
Figure 4D:
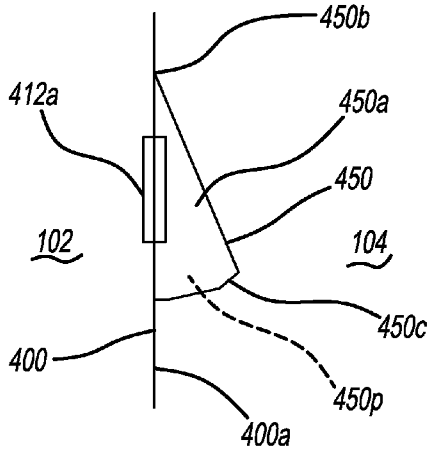
FIG. 4D shows a cross-sectional side view of a portion of a valve mechanism shown in FIG. 4B.
Figure 4E:
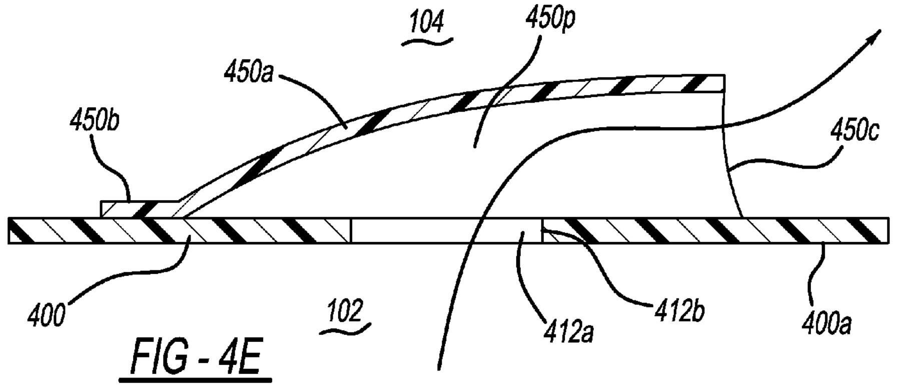
FIG. 4E is a cross-sectional view of a portion of a divider showing the valve cover of FIGS. 4C-4D in an open condition during a pressure differential tending to force gases from chamber 102 through opening 412*a* into chamber 104.
Figure 4F:
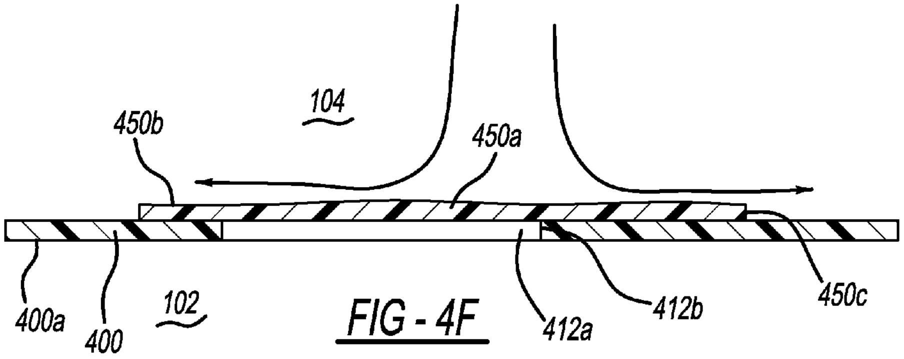
FIG. 4F is the cross-sectional view of FIG. 4E showing the valve cover in a closed condition during operation during a pressure differential tending to force gases from chamber 104 back through opening 412*a* into chamber 102.
Figure 4G:
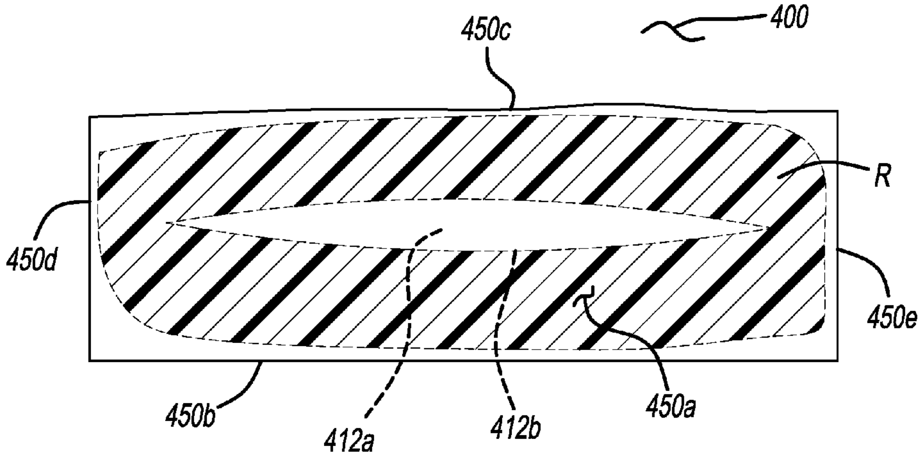
FIG. 4G is the valve cover of FIGS. 4C-4D in a closed condition, viewed looking in a direction from the lower chamber 104 toward the divider.

As used herein, the embodiments of the flow restriction valve mechanism described herein are considered to be in a "closed" condition when a valve cover is in contact with the divider along at least a continuous contact region R surrounding all the edges of the divider opening (similar to, for example, continuous region R surrounding opening 412*a* in FIG. 4G) which the valve cover is positioned to overlap, along the side of the divider along which the valve cover is positioned. In this condition, the valve cover may contacts the edges of the opening and/or portions of the divider surrounding and adjacent the edges of the opening which the valve cover is positioned to overlap. In this condition, the only pathway for gases from the lower chamber 104 to the divider opening(s) will be between the divider and a portion of the valve cover in contact with the divider. Thus, in this condition, the valve cover will provide maximum restriction to the backflow of gases from lower chamber 104 into upper chamber 102.

Also, as used herein, the embodiments of the flow restriction valve mechanism described herein are considered to be in a "open" condition when a valve cover of the mechanism is out of contact with or spaced apart from all of the edges of the divider opening(s) (for example, spaced apart from all edges 412*b* of the opening 412*a* in FIG. 4G) which the valve cover is positioned to overlap. In this condition, gases may flow freely through the divider opening and impinge upon the associated valve cover after passing through the divider opening.

Figure 5A:
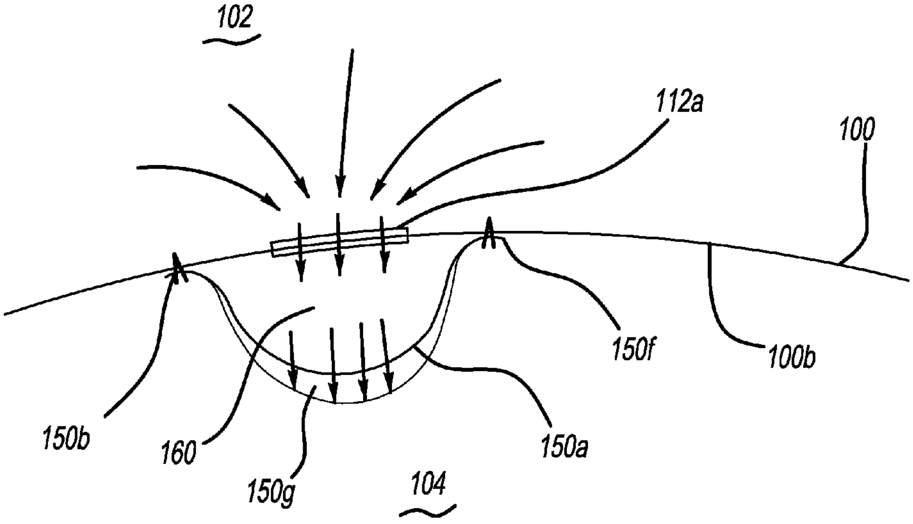
FIG. 5A is a partial cross-section side view of a portion of an airbag showing another embodiment of a valve mechanism attached to a divider panel.
Figure 5B:
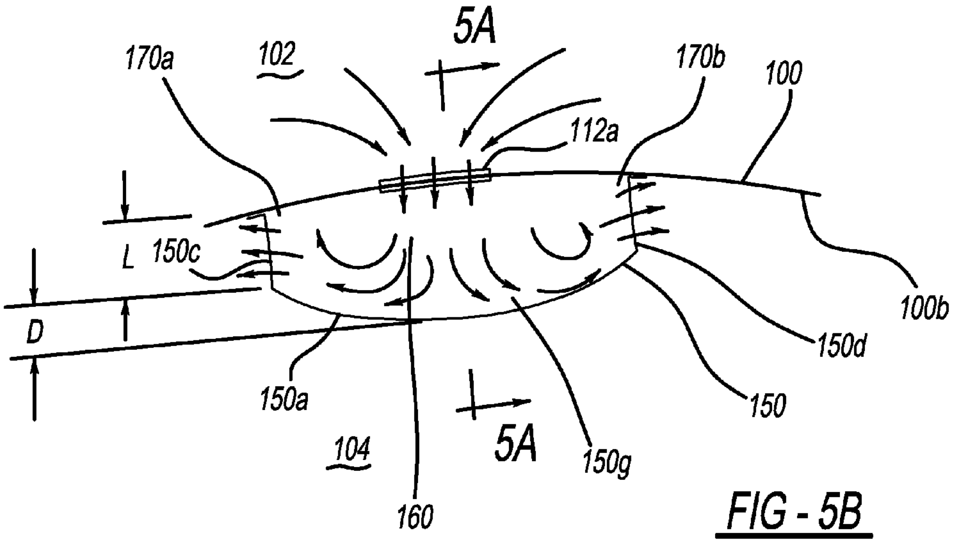
FIG. 5B is a partial cross-sectional front view of a portion of the airbag of FIG. 5A showing the valve mechanism embodiment in FIG. 5A.

FIG. 1 is a perspective view of a passenger-side airbag (in an inflated state) incorporating an airbag divider 100 and a flow restriction valve mechanism 112 in accordance with an embodiment described herein. FIG. 5A is a partial cross-sectional side view of a portion of an airbag showing one embodiment of a valve cover 150 attached to a divider panel 100. FIG. 5B is a partial cross-sectional front view of a portion of an airbag showing the valve cover embodiment 150 in FIG. 5A.

Referring to FIGS. 1, 5A and 5B, in one aspect of the embodiments described herein, a valve cover 150 is attached to a side 100*b* of divider 100 residing in lower chamber 104, so as to overlap divider opening(s) 112*a*. In this position, gases flowing through opening(s) 112*a* will impinge upon cover 150 prior to diffusing or spreading into the lower chamber. In an embodiment where a plurality of openings 112*a* are formed in divider 100, the valve cover is structured to overlap all of the openings while still functioning in the manner described herein. In an alternative embodiment, where multiple openings 112*a* are used, a separate cover 150 as shown in FIGS. 5A and 5B and as described herein is positioned over each of the openings.

In FIGS. 5A and 5B, the cover 150 has body 150*a*, a first edge 150*b* positioned relatively closer to the front portion of main panel 12, and a second edge 150*f* positioned along an opposite side of the body from the first edge 150*a* and relatively closer to the airbag rear inflation side 22. Cover 150 also has a first end 150*c* and a second end 150*d* opposite the first end.

Cover 150 may be stitched or otherwise suitably attached along edges 150*f* and 150*b* to divider 100 so as to form gas-tight seals between the cover edges and the divider 100. Ends 150*c* and 150*d* are unattached to the divider, thereby permitting gases flowing through the opening(s) 112*a* and (deflected by contact with the cover 150) to flow through passages 170*a* and 170*b* formed between the cover open ends 150*c*, 150*d* and the divider. Gases flow through the passages 170*a* and 170*b* into lower chamber 104.

In the embodiment shown in FIGS. 5A and 5B, cover 150 is attached to divider 100 so that the open ends 150*c* and 150*d* direct the gases toward opposite airbag side panels 14 and 16 (not shown). However, the cover may be attached to the divider so that the end(s) of the cover are oriented to direct the gas flow in any desired direction or directions, depending on the requirements of a particular application.

Referring to FIGS. 5A and 5B, in embodiments of the valve cover 150 described herein, the cover is configured and attached to divider 100 such that the unattached body 150*a* and the ends 150*c* and 150*d* of the cover move away from the divider responsive to gas flow through opening 112*a* impinging on the cover (or otherwise responsive to a pressure differential wherein the upper chamber pressure is greater than the lower chamber pressure), thereby forming a pocket or gas-receiving sub-chamber 160.

As seen in FIG. 5B, a portion of the body 150*a* between ends 150*c* and 150*d* is structured to form a depression 150*g* residing at a level below a lowest level L that either of the cover open ends 150*c* and 150*d* extend from the divider 100 when the cover is distended due to gas flow through opening(s) 112*a*. This depression and the sub-chamber 160 in general provide a region of turbulence where portions of the impinging gases are deflected and reflected in various directions, thereby mixing, combining and losing energy prior to exiting the sub-chamber through passages 170*a* and 170*b* formed between ends 150*c* and 150*d* and divider 100. In a particular embodiment, the gases flowing through opening(s) 112*a* are also further cooled during their residence within sub-chamber 160. If desired, one or more of the airbag panels and/or the divider may be formed from (or coated or impregnated with) a heat-absorbing material to facilitate cooling of the gases. It is believed that a depth D of the depression 150*g* below the level L (FIG. 5B) affects an average residence time of the gases in the sub-chamber 160. That is, the greater the depth D, the longer the average residence time of the gases in the sub-chamber 160 prior to exiting the sub-chamber through passages 170*a* and 170*b*. This depth D can be specified so as to increase or decrease the average residence time of the gases therein, according to the requirements of a particular application.

Stated another way, the cover 150 is structured so that a portion of the cover residing between the unattached edges 150*d* and 150*c* may be spaced apart from the divider a distance D+L that is greater than the maximum distance L between the divider and either of edges 150*d* and 150*c*, responsive to gas flow through opening 112*a* impinging on the cover (or otherwise responsive to a pressure differential wherein the upper chamber pressure is greater than the lower chamber pressure).

In another aspect of the valve cover embodiments described herein, the cover 150 is also structured and attached to divider 100 so as to overlap opening(s) 112*a* such that, if a surge or other pressure differential occurs wherein the lower chamber pressure is greater than the upper chamber pressure (thereby tending to force gases from lower chamber 104 back through opening(s) 112*a*), the cover body 150*a* will be forced in a direction toward opening(s) 112*a* and into a closed condition, wherein the cover contacts the divider along a continuous region surrounding the opening (similar to region R shown in FIG. 4G, and as previously described) along the side of the divider on which the cover 150 is positioned, thereby blocking the opening(s) and restricting backflow of the gases into chamber 102. Such a reverse pressure differential may occur, for example, responsive to a vehicle passenger contacting the airbag exterior along the lower chamber 104 during or after airbag inflation.

Figure 2:
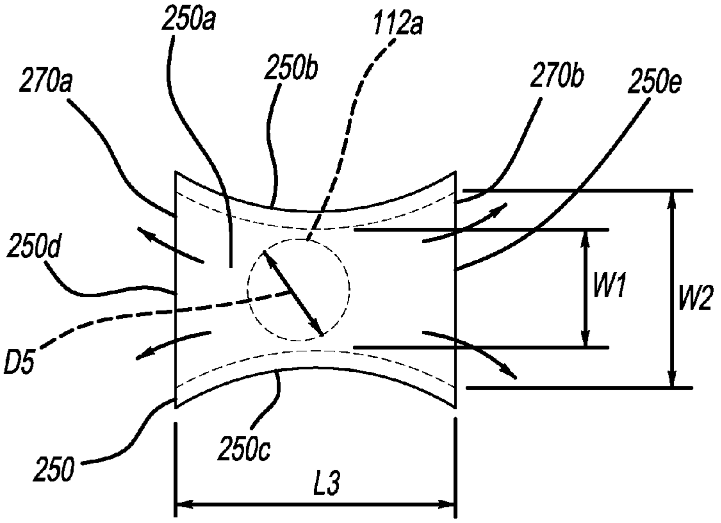
FIG. 2 shows a plan view of a valve cover in accordance with one particular embodiment, as viewed looking in a direction from the lower chamber toward the divider.

FIG. 2 shows a plan view of a valve cover 250 in accordance with one particular embodiment, as viewed from an underside of the divider (i.e., in position within second chamber 104 and looking toward the divider). In the embodiment shown in FIG. 2, cover 250 has a body 250*a*, a first edge 250*b* attached to the divider 100 and having a concave shape with respect to the body, and a second edge 250*c* positioned along an opposite side of the body from the first edge 250*a*, attached to the divider 100 and also having a concave shape with respect to the body. Cover 250 also has a first open or unattached edge or end 250*d* and a second open or unattached edge or end 250*e* opposite the first end. The cover has an attached length L3 extending between the unattached edges 250*d* and 250*e*.

In the embodiment shown in FIG. 2, a single opening 112*a* is formed in the divider. However, as stated previously, multiple gas flow openings may also be formed through the divider.

In a particular embodiment, opening 112*a* is circular and has a diameter D5 of 120 millimeters, although the opening may have any shape or dimensions needed to meet a particular requirement.

Cover 250 may be stitched or otherwise suitably attached along edges 250*c* and 250*b* to divider 100 so as to form gas-tight seals between the cover edges and the divider 100. Ends 250*e* and 250*d* are unattached to the divider, thereby permitting gases flowing through the opening 112*a* and deflected by contact with the cover 250 to flow between the cover open ends 250*e* and 250*d* and the divider and into the lower chamber 104. Cover 250 may be structured and attached to divider 100 so as to react as shown in FIGS. 5A and 5B and as previously described responsive the gas flow through the opening(s) 112*a*. More specifically, the cover 250 may be structured and attached to divider 100 so as to form a depression and sub-chamber responsive to a flow of gases through the opening(s) 112*a*, as previously described.

In the embodiment shown in FIG. 2, cover 250 is attached to divider 100 so that gas flow passages 270*a* and 270*b* are formed between cover ends or edges 250*d* and 250*e* and the divider 100, to direct the gases toward opposite airbag side panels 14 and 16. However, any open end(s) of the cover when attached to the divider may be oriented so as to direct the gas flow in any desired direction or directions, depending on the requirements of a particular application.

In the embodiment shown in FIG. 2, the width W1 of at least a portion of a sub-chamber 260 defined between the cover 250 and the divider and between the unattached cover ends or edges 250*d* and 250*e*, is less than the narrowest width W2 of the sub-chamber at either of edges 250*d* and 250*e*. This size difference makes the open ends of the sub-chamber 260 along unattached edges 250*e* and 250*d* relatively wider than the central portion of the sub-chamber proximate where the gases pass through the divider openings 112. This enables the gas pressure to drop to some degree as the gases flow from openings 112 toward the cover ends 250*e* and 250*d*.

The valve cover 250 is also configured and attached to divider 100 such that the unattached body 250*a* and the ends 250*d* and 250*e* of the cover move away from the divider responsive to gas flow through opening 112*a* impinging on the cover (or otherwise responsive to a pressure differential wherein the upper chamber pressure is greater than the lower chamber pressure), thereby forming an associated pocket or gas-receiving sub-chamber.

The cover 250 is also structured and attached to divider 100 so as to overlap the opening(s) 112*a* such that, if a surge or other pressure differential occurs wherein the lower chamber pressure is greater than the upper chamber pressure (thereby tending to force gases from lower chamber 104 back through opening(s) 112*a*), the cover body 250*a* will be forced in a direction toward opening(s) 112*a* and into a closed condition, wherein the cover contacts the divider along a continuous region surrounding the opening (similar to region R shown in FIG. 4G, and as previously described) along the side of the divider on which the cover 250 is positioned, thereby blocking the opening(s) and restricting backflow of the gases into chamber 102. Such a reverse pressure differential may occur, for example, responsive to a vehicle passenger contacting the airbag exterior along the lower chamber 104 during or after airbag inflation.

Figure 3A:
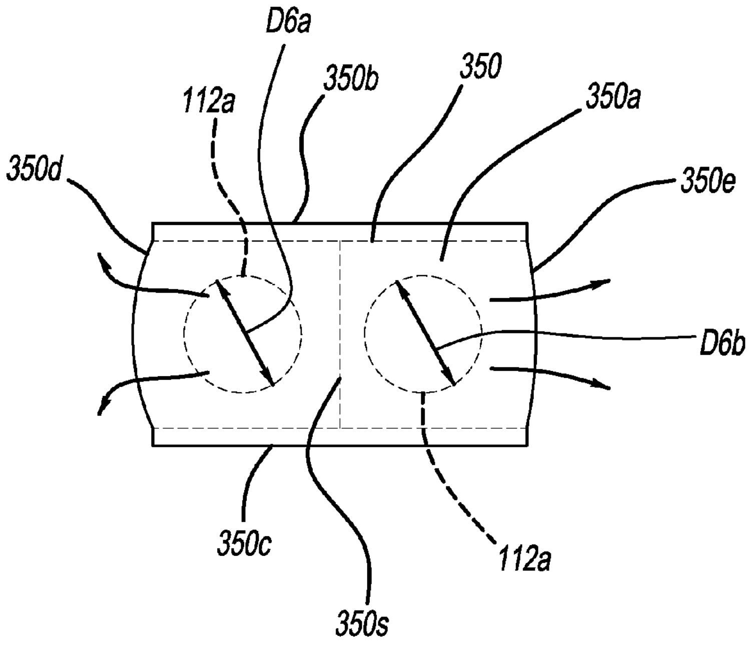
FIG. 3A shows a plan view of a valve cover in accordance with another particular embodiment, as viewed looking in a direction from the lower chamber toward the divider.
Figure 3B:
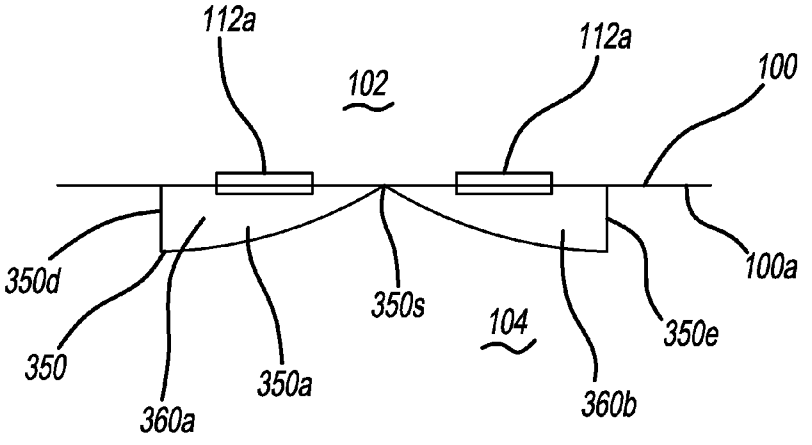
FIG. 3B shows a cross-sectional side view of the valve cover of FIG. 3A mounted to the divider.

FIG. 3A shows a plan view of a valve cover 350 in accordance with another particular embodiment, as viewed from an underside of the divider, in second chamber 104. FIG. 3B shows a partial cross-sectional side view of the valve cover of FIG. 3A mounted to the divider 100.

In the embodiment shown in FIGS. 3A and 3B, cover 350 has a body 350*a*, a first edge 350*b* attached to the divider 100, and a second edge 350*c* positioned along an opposite side of the body from the first edge 350*b* and attached to the divider 100. Cover 350 also has a first end 350*d* and a second end 350*e* opposite the first end. In the embodiment shown in FIGS. 3A and 3B, the cover 350 overlies a pair of gas flow openings 112*a* formed in the divider. In a particular embodiment, openings 112*a* have equal diameters D6a and D6b of 54 millimeters, although each opening may have any particular shape or dimensions needed to meet a particular requirement.

Cover 350 may be stitched or otherwise suitably attached along edges 350*c* and 350*b* to divider 100 so as to form gas-tight seals between the cover edges and the divider 100. Ends 350*e* and 350*d* are unattached to the divider, thereby permitting gases flowing through the openings 112*a* and deflected by contact with the cover 350 to flow between the cover open ends and the divider and into the lower chamber 104. In addition, cover 350 is attached to divider 100 along a gas-tight seam 350*s* formed between openings 112*a* and extending between the seams attaching edges 350*c* and 350*b* to divider 100. This divides the sub-chamber 360 into a pair of smaller chambers 360*a* and 360*b*. Each smaller chamber is structured to receive gas flow from an associated one of openings 112*a* and to direct this gas flow toward a respective one of cover ends 350*e* and 350*d*, as previously described.

In the embodiment shown in FIGS. 3A and 3B, cover 350 is attached to divider 100 so that the open ends 350*e* and 350*d* direct the gases toward opposite airbag side panels 14 and 16. However, any open end(s) of the cover when attached to the divider may be oriented so as to direct the gas flow in any desired direction or directions, depending on the requirements of a particular application.

The cover 350 is configured and attached to divider 100 such that the edges 350*e* and 350*d* and the unattached portions of body 350*a* residing between seam 350*s* and edges 350*e* and 350*d* move away from the divider responsive to gas flow through opening 112*a* impinging on the cover (or otherwise responsive to a pressure differential wherein the upper chamber pressure is greater than the lower chamber pressure), thereby forming a pocket or gas-receiving sub-chamber between the cover 350 and the divider.

The cover 350 is also structured and attached to divider 100 so as to overlap openings 112*a* such that, if a surge or other pressure differential occurs wherein the lower chamber pressure is greater than the upper chamber pressure (thereby tending to force gases from lower chamber 104 back through opening(s) 112*a*, the unattached portions of body 350*a* residing between seam 350*s* and edges 350*e* and 350*d* will be forced in a direction toward opening(s) 112*a* and into a closed condition, wherein the cover contacts the divider along a continuous region surrounding the opening (similar to region R shown in FIG. 4G, and as previously described) along the side of the divider on which the cover 350 is positioned, thereby blocking the opening(s) and restricting backflow of the gases into chamber 102. Such a reverse pressure differential may occur, for example, responsive to a vehicle passenger contacting the airbag exterior along the lower chamber 104 during or after airbag inflation.

Referring to FIGS. 4A-4D, in another embodiment, the flow restriction valve mechanism is in the form of one or more gas flow openings in the form of at least one longitudinal slit or gill 412*a* formed in the divider 400, the divider having a leading edge 400*a* similar to leading edge 100*a* in FIG. 1. Each of opening(s) 412*a* is defined by an edge 412*b*. In the embodiment shown, a plurality of slits 412*a* are employed, all having equal lengths L1 and each having a longitudinal axis L7 with the axes L7 extending parallel to each other. However, any of slit(s) 412*a* may have any desired length and/or may extend along multiple non-parallel axes, in any directions desired to meet the requirements of a particular application. Each of opening(s) 412*a* is defined by one or more edges 412*b*. In addition, as stated previously, the slit dimensions are specified so as to provide a total cross-sectional gas flow passage area needed to enable a volumetric flow rate of gas through the slit(s) sufficient to fill the airbag lower chamber within a desired time period, when the valve mechanisms are forced into an open condition by gas flow from the upper chamber 102 into the lower chamber 104. The slit dimensions and/or number of slits needed to enable the desired flow rate may be determined analytically or iteratively, by experimentation, using known methods. In a particular embodiment, each of slits 412*a* has a nominal length L1 of 200 millimeters.

In a particular embodiment, each of slits 412*a* is longitudinal and has a pair of opposed, coaxial ends.

In a particular embodiment, slits 412*a* extend parallel to each other and have longitudinal ends spaced apart from each other a distance L5 of 20 millimeters.

In a particular embodiment, slits 412*a* are evenly distributed along a portion M1 of the length M2 of the divider, the portion M1 constituting 40% of the total length M2 of the divider when the divider is laid out on a flat surface.

In FIGS. 4A-4D, the embodiment of the flow restriction valve mechanism shown also includes a separate cover 450 positioned to overlie and overlap each slit 412*a*. Each cover 450 has a body 450*a*, a first edge 450*b*, a second edge 450*c* opposite the first edge, and a pair of opposite ends or edges 450*d* and 450*e*. First edge 450*b* may be stitched or otherwise attached to divider 400 so as to form a gas-tight seal therebetween. Each of ends 450*d* and 450*e* may also be stitched or otherwise attached to divider 400 so as to form a gas-tight seal between the end and the divider. Edge 450*c* is unattached to the divider.

In addition, the cover 450 is structured and attached to the divider so as to permit at least body 450*a* and second edge 450*c* to be forced in a direction away from the divider responsive to gases flowing through opening(s) 412*a* and impinging upon the valve cover, or otherwise responsive to a pressure differential wherein the upper chamber pressure is greater than the lower chamber pressure. In this instance, the pressure differential forms a gas flow passage or gas-receiving sub-chamber 450*p* (FIGS. 4C and 4D) between the cover 450 and the divider, and leading from between the cover and the divider into the lower chamber 104.

The cover 450 is also structured and attached to divider 400 so as to overlap the opening(s) 412*a* such that, if a surge or other pressure differential occurs wherein the lower chamber pressure is greater than the upper chamber pressure (thereby tending to force gases from lower chamber 104 back through opening(s) 112*a*, the cover body 450*a* will be forced in a direction toward opening(s) 112*a* and into a closed condition, wherein the cover contacts the divider along a continuous region surrounding the opening (similar to region R shown in FIG. 4G, and as previously described) along the side of the divider on which the cover 450 is positioned, thereby blocking the opening(s) and restricting backflow of the gases into chamber 102. Such a reverse pressure differential may occur, for example, responsive to a vehicle passenger contacting the airbag exterior along the lower chamber 104 during or after airbag inflation.

FIG. 4E is a cross-sectional view of a portion of a divider showing the valve cover of FIGS. 4C-4D in an open condition during a pressure differential tending to force gases from chamber 102 through opening 412*a* into chamber 104. FIG. 4F is the cross-sectional view of FIG. 4E showing the valve cover in a closed condition during operation during a pressure differential tending to force gases from chamber 104 back through opening 412*a* into chamber 102. FIG. 4G shows the valve mechanism in a closed condition, with the valve cover 450 in contact with the divider along a continuous region R surrounding the opening 412*a*. It is seen in FIG. 4G that, in the closed condition described herein, the valve cover 450 contacts the divider 400 proximate the edges 412*b* of the divider opening(s) 412*a* and overlaps the openings so as to restrict backflow through the opening(s) into chamber 102.

Although operation of the valve cover embodiment 450 is shown in FIGS. 4E and 4F and described in detail herein, all of the valve cover embodiments described herein are structured so as to be spaced apart from the edges of the openings they cover, responsive to gas flowing from chamber 102 through the openings and into chamber 104. Also, all of the valve cover embodiments described herein are structured so as to contact the divider and overlap the edges of the openings they cover responsive to a pressure differential wherein a gas pressure in chamber 104 is greater than a pressure in chamber 102.

In the embodiments described herein, it has been found that the degree of deflection of the divider toward the lower chamber 104 during passage of gases from upper chamber 102 to lower chamber 104 may be affected by the number, distribution and sizes of the divider gas flow openings. For example, in an embodiment incorporating longitudinal slits or gills 412*a*, increasing the number of slits along the divider has been found to reduce the forces acting to urge the divider toward the lower chamber 104, along the region of the divider including the slits. Also, distributing the slits over a greater area of the divider has been found to reduce the forces acting to urge the divider toward the lower chamber 104, along the region of the divider including the slits. Also, increasing the sizes of the slits (or the combined area of the slits) formed along the divider has been found to reduce the forces acting to urge the divider toward the lower chamber 104, along the region of the divider including the slits.

In the embodiments described herein, it is also desirable for the valve mechanism to impede or restrict gas flow from the upper chamber 102 into the lower chamber 104 as little as possible, so that the entire volume of the airbag fills as rapidly as possible. In addition, if gas flow from the upper chamber into the lower chamber is excessively obstructed (i.e., if gas flow from the upper chamber into the lower chamber is excessively impeded) by providing insufficient total divider opening area, the upper chamber may fill rapidly before sufficient gas can be transferred to the lower chamber, thereby causing the airbag to undesirably "bounce" downwardly prior to full inflation of the lower chamber. To facilitate rapid inflation of the entire airbag and to aid in preventing airbag bounce, as stated previously, the total area of the divider opening(s) is specified so as to ensure gas flow into the lower chamber 104 at a rate sufficient to fill the airbag within a predetermined time period.

Figure 7:
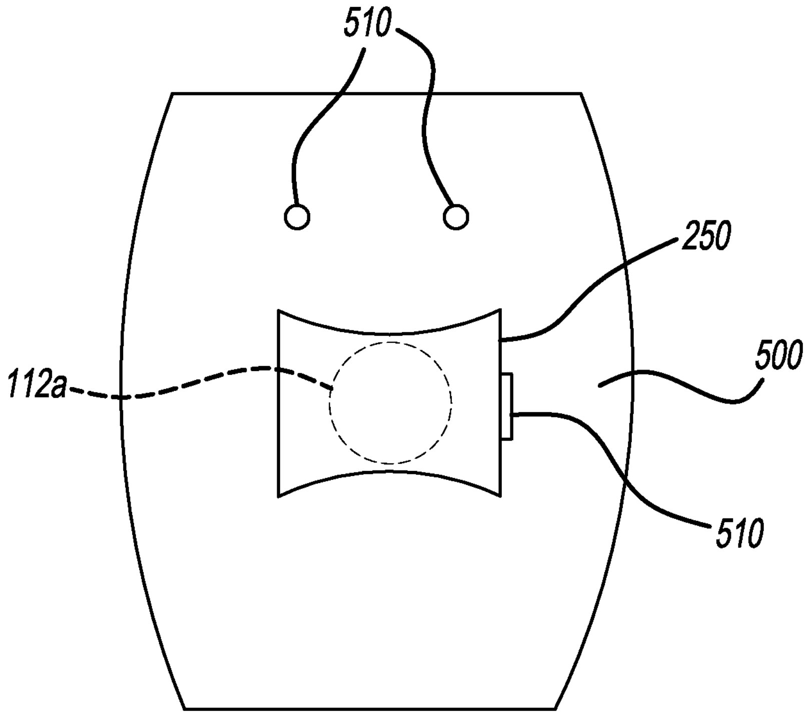
FIG. 7 is a plan view of a divider as viewed looking in a direction from the lower chamber toward the divider, the divider incorporating a valve cover in accordance with an embodiment described herein, and also incorporating at least one divider vent hole enabling fluid communication between opposite sides of the divider.

Referring to FIG. 7, in another embodiment, in addition to one or more of the flow-restriction valve embodiments described herein, the divider includes one or more backflow vent holes 510 formed therealong. FIG. 7 shows a divider embodiment 500 incorporating a main divider opening 112*a* and a flow restriction valve cover 250 as shown in FIG. 2. However, the backflow vent holes may be utilized in a divider incorporating any embodiment of the valve covers described herein. In addition, a single vent hole 510 or a plurality of vent holes may be employed, according to the requirements of a particular application.

Vent hole(s) 510 are uncovered and are configured to permit a limited, metered backflow of gases between opposite sides of the divider 500, from lower chamber 104 into the upper chamber 102 during a reverse pressure differential tending to force gases from chamber 104 into chamber 102, and while the flow restriction valve(s) are covering or closing the divider openings 112*a* so as to restrict the backflow through divider openings. In a particular embodiment, one or more vent holes 510 are formed along and extend in a direction away from edges of one or more associated valve covers coupled to the divider. In another particular embodiment, one or more vent holes are formed along portions of the divider spaced apart from any valve cover attached to the divider. Parameters such as the locations of the vent holes 510 along the divider and the sizes of the vent holes 510 may be specified according to the crash pulse.

Vent holes 510 enable the pressure in lower chamber 104 to be reduced at a more rapid rate than would be the case if backflow into upper chamber 102 was permitted only via gas leakage through the valve covers when the covers are in a closed condition. In cases where the crash pulse is more severe (i.e., has a steeper initial upward slope), vent holes 510 also provide additional gas flow pathways from the upper chamber into the lower chamber during initial bag inflation, thereby enabling the lower chamber to fill relatively faster.

The vent holes also enable the gases in the lower chamber 104 to be "recycled" and redistributed into the upper chamber after passenger contact with the airbag, to help maintain a relatively higher pressure in the upper chamber (if desired) for a longer period than would be the case if the upper chamber gases were allowed to vent to the airbag exterior through the airbag upper chamber vents without being replenished. This permits the airbag to support the head and upper body of the occupant to a greater degree and for a longer period of time after contact, thereby decreasing rotation of the body of the occupant about the seated hip region and reducing the severity of force moments acting on the neck of the occupant.

Figure 6:
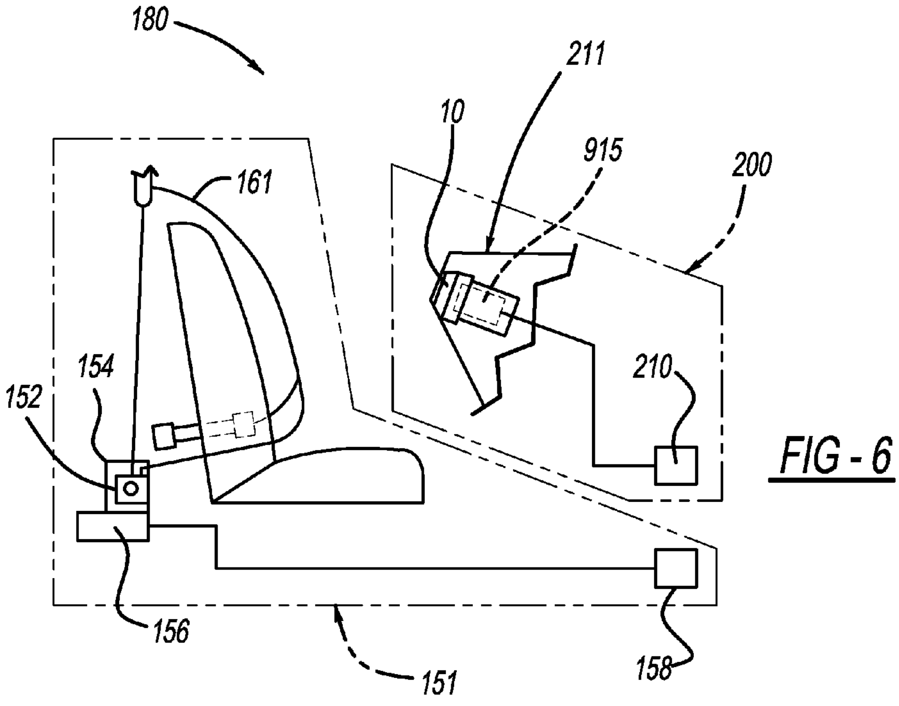
FIG. 6 is a schematic representation of an exemplary vehicle occupant protection system including an airbag incorporating a valve mechanism in accordance with an embodiment described herein.

Referring now to FIG. 6, any of the airbag embodiments described herein may be incorporated into an airbag system 200. Airbag system 200 includes at least one airbag 10 incorporating a flow restriction valve mechanism in accordance with an embodiment described herein and a gas source 915 incorporated into or operatively coupled to airbag 10 so as to enable fluid communication with an interior of the airbag upon activation of the airbag system. Airbag 10 may be mounted in a vehicle dashboard 211 or another suitable portion of the vehicle. Airbag system 200 may also be in communication with a collision event sensor 210 implementing or operable in association with a known collision sensor algorithm that signals actuation of airbag system 200 in the event of a collision.

In operation of the valve mechanism embodiments described herein, during a vehicle collision event, an activation signal is sent from sensor 210 or from a suitable controller, causing the airbag 10 to inflate. During inflation, the flow restriction valve mechanisms are in an open condition to permit free flow of inflation gases from upper chamber 102 into lower chamber 104, thereby facilitating rapid inflation of the airbag. As the body of the passenger moves forward, the passenger's torso first contacts the portion of the airbag exterior of the airbag lower chamber 104. The pressure on the lower chamber 104 exerted by passenger contact with the airbag produces a pressure differential between the lower and upper chambers which causes the valve cover(s) in the valve mechanism(s) to close, thereby restricting backflow of the inflation gases into upper chamber 102.

The pressure force and also the speed with which the valve cover material constricts the flow passages also increase as the pressure difference between the two chambers increases, so that the flow restriction valves continue to restrict backflow while the pressure differential exists, even at relatively high pressure differences between the chambers. Restriction of backflow into the upper chamber 102 through closure of the valve mechanism enables maintenance of a prolonged sustained relatively high, inflated pressure in the lower chamber 104, which provides relatively firmer support for the lower body of the passenger during contact with the airbag.

As the body of the passenger continues moving forward, the head of the passenger contacts the airbag exterior along the upper chamber 102. This contact forces gases to flow from the upper chamber to the airbag exterior via the upper chamber vents. In this manner, the passenger upper body contact forces are absorbed and the passenger head is cushioned by the airbag while the torso and lower body of the passenger remain supported by the pressurized lower chamber.

Referring again to FIG. 6, an airbag 10 in accordance with an embodiment described herein or an airbag system 200 including such an embodiment may also be incorporated into a broader, more comprehensive vehicle occupant protection system 180 including additional elements such as a safety belt assembly 151. FIG. 6 shows a schematic diagram of one exemplary embodiment of such a protection system. Safety belt assembly 151 includes a safety belt housing 152 and a safety belt 161 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 151 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, which are incorporated herein by reference, provide illustrative examples of pretensioners actuated in such a manner.

As utilized herein, the term "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described are considered to be within the scope of the invention as described herein.

The terms "coupled," "connected," "attached" and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," "side", etc., are merely used to describe the orientation of various elements in the drawing FIGURES. It should be noted that the orientation of various elements may differ according to other exemplary embodiments, and that such variations are intended to be encompassed by the present disclosure.

It is important to note that the construction and arrangement of the airbag and valve embodiments as shown and described herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Also, characteristics described as being formed from multiple elements may, in the alternative, be formed integrally if feasible. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

In addition, airbags having the same exterior dimensions and structure may be used for multiple applications, because variations in airbag performance characteristics due to design requirements may be achieved by modifying the interior structure of the airbag (for example, by changing the location of the divider, by modifying the flow characteristics of the various valve embodiments connecting the upper and lower chambers). This ability to use a common exterior structure provides a degree of uniformity in bag design and manufacturing.

It will also be understood that the foregoing descriptions of the various embodiments are for illustrative purposes only. As such, the various structural and operational features herein disclosed are susceptible to a number of modifications, none of which departs from the scope of the appended claims.

What is claimed is:

1. A divider for an airbag, the divider comprising:

a first side;

a second side opposite the first side;

at least one opening structured to enable fluid communication between the first side and the second side;

a valve cover positioned on the second side over the at least one opening, the valve cover having:

a first pair of opposed edges attached to the divider; and a second pair of opposed edges not attached to the divider, wherein the valve cover is structured so as to space apart from edges of the at least one opening responsive to a pressure differential wherein a pressure on the first side is greater than a pressure on the second side, and wherein the cover is structured so as to contact the divider and overlap the edges of the at least one opening responsive to a pressure differential wherein a pressure on the second side is greater than a pressure on the first side.

2. An airbag comprising:

an outer shell defining an interior of the airbag; and a divider in accordance with claim 1 positioned in the interior so as to divide the interior into a first chamber on the divider first side and a second chamber on the divider second side.

3. A vehicle occupant protection system including an airbag in accordance with claim 2.

4. A vehicle comprising an airbag accordance with claim 2.

5. The divider of claim 1 wherein the at least one opening is a longitudinal slit having a pair of opposed, coaxial ends.

6. An airbag module including an airbag in accordance with claim 2.

7. The divider of claim 1 further comprising a plurality of openings structured to enable fluid communication between the first side and the second side, and a separate valve cover positioned on the second side over each opening of the plurality of openings.

8. The divider of claim 1 further comprising at least one divider vent hole formed along the divider.

9. The divider of claim 8 wherein the at least one vent hole is formed along an edge of a valve cover operatively coupled to the divider.

10. An airbag comprising:

an outer shell defining an interior of the airbag; and a divider in accordance with claim 8 positioned in the interior so as to divide the interior into a first chamber on the divider first side and a second chamber on the divider second side.

11. A vehicle occupant protection system including an airbag in accordance with claim 10.

12. A vehicle comprising an airbag accordance with claim 10.

13. An airbag module including an airbag in accordance with claim 10.

14. The divider of claim 10 further comprising at least one divider vent hole formed along the divider.

15. The divider of claim 14 wherein the at least one vent hole is formed along an edge of a valve cover operatively coupled to the divider.

16. A divider for an airbag, the divider comprising: a first side;

a second side opposite the first side;

at least one opening structured to enable fluid communication between the first side and the second side;

a valve cover positioned on the second side over the at least one opening, the valve cover having a first pair of opposed edges attached to the divider and a second pair of opposed edges unattached to the divider, wherein a portion of the cover residing between the second pair of opposed edges is structured so as to be spaced apart from the divider a distance greater than a distance between the divider and either edge of the second pair of opposed edges responsive to a pressure differential wherein a pressure on the first side is greater than a pressure on the second side.

17. A divider for an airbag, the divider comprising:

a first side;

a second side opposite the first side;

at least one opening structured to enable fluid communication between the first side and the second side;

a valve cover positioned on the second side over the at least one opening to define a sub-chamber between the divider and the valve cover, the valve cover having: a first pair of opposed edges attached to the divider; and a second pair of opposed edges unattached to the divider, wherein a width of the cover between the edges of the second pair of opposed edges is less than a narrowest width of the sub-chamber at either edge of the second pair of opposed edges.

18. The divider of claim 17 further comprising at least one divider vent hole formed along the divider.

19. The divider of claim 18 wherein the at least one vent hole is formed along an edge of a valve cover operatively coupled to the divider.

20. An airbag comprising:

an outer shell defining an interior of the airbag; and a divider in accordance with claim 17 positioned in the interior so as to divide the interior into a first chamber on the divider first side and a second chamber on the divider second side.

21. A vehicle occupant protection system including an airbag in accordance with claim 20.

22. A vehicle comprising an airbag accordance with claim 20.

23. An airbag module including an airbag in accordance with claim 20.

24. A divider for an airbag, the divider comprising:

a first side;

a second side opposite the first side;

a plurality of openings structured to enable fluid communication between the first side and the second side;

a valve cover positioned on the second side over each opening of the plurality of openings, the valve cover having:

a first pair of opposed edges attached to the divider; and another edge extending between the edges of the first pair of opposed edges, the other edge being attached to the divider.

25. The divider of claim 24 wherein the first pair of opposed edges and the other edge are attached to the divider so as to form a sub-chamber between the first pair of opposed edges, the other edge, and the divider, wherein the other edge is attached to the divider along a seam extending between openings of the plurality of openings so as to divide the sub-chamber into a pair of smaller chambers, and wherein each smaller chamber is structured to receive gas flow from an associated opening of the plurality of openings.

26. The divider of claim 24 wherein each opening of the plurality of openings is a longitudinal slit having a pair of opposed, coaxial ends, each slit having a longitudinal axis, and wherein the longitudinal axes extend parallel to each other.

* * * * *